US005788340A

United States Patent [19]

Kobayashi

[11] Patent Number: 5,788,340

[45] Date of Patent: Aug. 4, 1998

[54] FLUID PRESSURE CONTROL APPARATUS AND BRAKING DEVICE USING THEREOF

[75] Inventor: Tadashi Kobayashi, Saitama, Japan

[73] Assignees: Akebono Brake Industry Co., Ltd., Tokyo; Akebono Research and Development Centre Ltd., Saitama, both of Japan

[21] Appl. No.: 731,558

[22] Filed: Oct. 16, 1996

[30] Foreign Application Priority Data

Oct. 19, 1995 [JP] Japan .................................. 7-271114

[51] Int. Cl.[6] .................................................. B60T 8/34

[52] U.S. Cl. .................................. 303/113.1; 303/115.1

[58] Field of Search .............................. 303/113.1, 115.1, 303/115.2; 188/72.6, 156, 368

[56] References Cited

U.S. PATENT DOCUMENTS 5,000,521 3/1991 Majima .............................. 303/113.1
5,067,778 11/1991 Testardi .............................. 303/113.1
5,645,143 7/1997 Mohr .................................. 303/113.1

*Primary Examiner*—Robert J. Oberleitner
*Assistant Examiner*—C. T. Bartz
*Attorney, Agent, or Firm*—Morgan, Lewis & Bockius LLP

[57] ABSTRACT

A fluid pressure control apparatus provided in a fluid pressure circuit between a fluid pressure generating source and an actuator, which controlls fluid pressure acting on the actuator, comprises: a cylinder in which a fluid pressure chamber is formed so as to communicate with the fluid pressure generating source and the actuator; a cam casing disposed in the fluid pressure chamber; a cam shaft disposed in the cam casing; a pressure control piston driven by the cam shaft so as to appear and disappear in the fluid pressure chamber; and a cam drive mechanism for driving the cam shaft.

8 Claims, 7 Drawing Sheets

DEVELOPMENT LINE OF CAM FACE
A
B
20a
23a
PISTON STROKE B
PISTON STROKE A
13
25
22a
23a
23a

COMMON CAM FACE FOR ANTI-LOCK AND TRACTION CONTROL

CAM FACE FOR ANTI-LOCK CONTROL 4
12
23a
20a
25
13
22a
20b
22b
23b

FLUID PRESSURE CONTROL APPARATUS AND BRAKING DEVICE USING THEREOF

BACKGROUND OF THE INVENTION

1. Field of the Invention

The present invention relates to a fluid pressure control apparatus for smoothly increasing/decreasing the fluid pressure in a fluid pressure control circuit, and it further relates to a small-size and light-weight braking device in which the above-mentioned fluid pressure control apparatus is built in a caliper of a disc brake of a vehicle to thereby perform smooth fluid pressure control such as anti-lock control, traction control, etc.

2. Description of the Prior Art

Recently, development of anti-lock control apparatus has been positively promoted in order to improve the stability in control at the time of braking to thereby make it easy for a driver to perform drive operation. As such a kind of anti-lock control apparatus for a vehicle, those disclosed in Japanese Patent Publication No. Sho. 64-47650 etc., are known.

The anti-lock control apparatus disclosed in the above Japanese Patent Publication No. Sho. 64-47650 is provided with a braking device operated by fluid pressure supplied from a master cylinder and an anti-lock controlling modulator disposed in a brake line connecting the master cylinder to a wheel cylinder, wherein a ball valve disposed in this modulator is controlled precisely by using a stepping motor to increase/decrease the fluid pressure supplied to the braking device to thereby eliminate a wheel lock phenomenon.

In the above anti-lock control apparatus, however, it is necessary to provide a modulator for performing anti-lock control in the middle of a brake line separately from a braking device attached on a wheel side, resulting in a problem that the apparatus becomes large-sized and complicated.

Separately from the above-mentioned prior art anti-lock control apparatus, there has been proposed another anti-lock control apparatus in which a braking fluid pressure controlling mechanism is built in a brake caliper in order to make the apparatus small-sized (Japanese Patent Publication No. 61-166759). In this anti-lock control apparatus, a braking fluid pressure controlling mechanism of the piezoelectric type is built in a brake caliper so that the braking fluid pressure control is performed by using the deformation of a piezoelectric element. Also in this apparatus, however, it is necessary to provide a displacement member in order to enlarge the amount of movement of a brake piston provided in the fluid pressure controlling mechanism, resulting in a problem that the configuration becomes complicated and the manufacturing cost becomes high. There is a further problem that it is difficult to build a complicated mechanism into a caliper located under a spring of a car body because of limitation of the caliper in weight and size, etc. Employing a complicated mechanism, the apparatus apt to generate noises and vibrations to make it impossible to perform the fluid pressure control smoothly.

SUMMARY OF THE INVENTION

In order to solve the above problems, it is an object of the present invention to provide a small-size and light-weight fluid pressure control apparatus in which the fluid pressure in a fluid pressure circuit can be increased/decreased simply and smoothly by using pressure control pistons operated by a cam mechanism. It is another object of the present invention to provide a light-weight small-size braking device in which the above-mentioned fluid pressure control apparatus is built in a caliper of a disc brake. According to this apparatus, it is possible to increase/decrease the fluid pressure in a fluid pressure circuit smoothly and accurately, it is possible to obtain a light-weight small-size braking device by incorporating this apparatus into a brake caliper, and it is possible to smoothly perform fluid pressure control such as anti-lock control, traction control, automatic brake, etc., in vehicles.

In order to achieve the above objects, according to an aspect of the present invention, there is provided a fluid pressure control apparatus provided in a fluid pressure circuit between a fluid pressure generating source and an actuator, which controlls fluid pressure acting on the actuator, comprising: a cylinder in which a fluid pressure chamber is formed so as to communicate with the fluid pressure generating source and the actuator; a cam casing disposed in the fluid pressure chamber; a cam shaft disposed in the cam casing; a pressure control piston driven by the cam shaft so as to appear and disappear in the fluid pressure chamber; and a cam drive mechanism for driving the cam shaft.

According to another aspect of the present invention, there is provided a braking device comprising: a cylinder;

a brake piston slidably disposed in the cylinder, a fluid pressure chamber being defined in the cylinder by the piston; a cam casing disposed in the fluid pressure chamber; a cam shaft disposed in the cam casing; a pressure control piston driven by the cam shaft so as to appear and disappear in the fluid pressure chamber; and a cam drive mechanism for driving the cam shaft.

DETAILED DESCRIPTION OF THE PREFERRED EMBODIMENTS

Figure 1:
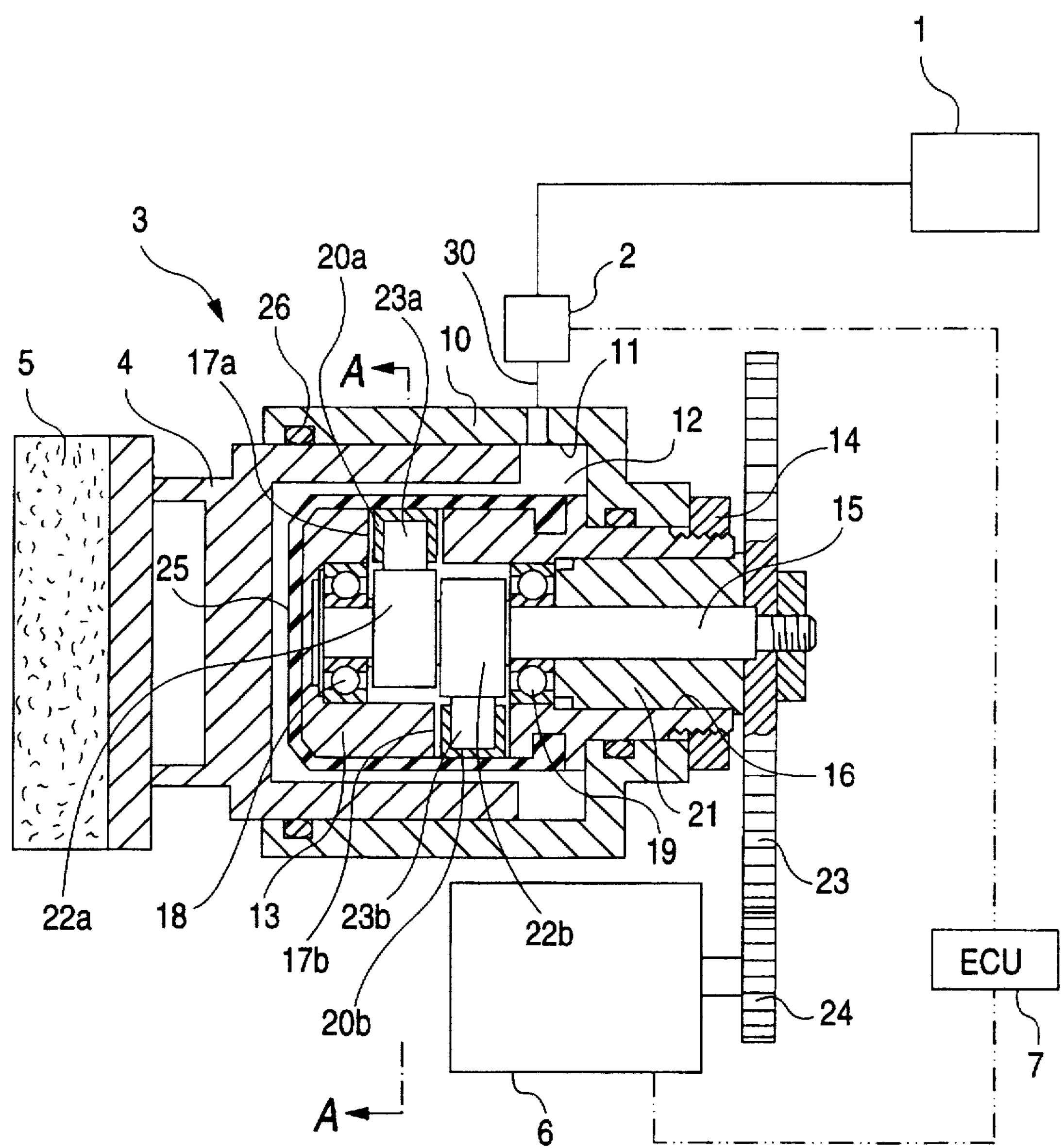
FIG. 1 is a schematic view showing the configuration of the braking device as a first embodiment of the present invention.

Referring to the drawings, an embodiment of the present invention will be described under.

Figure 2:
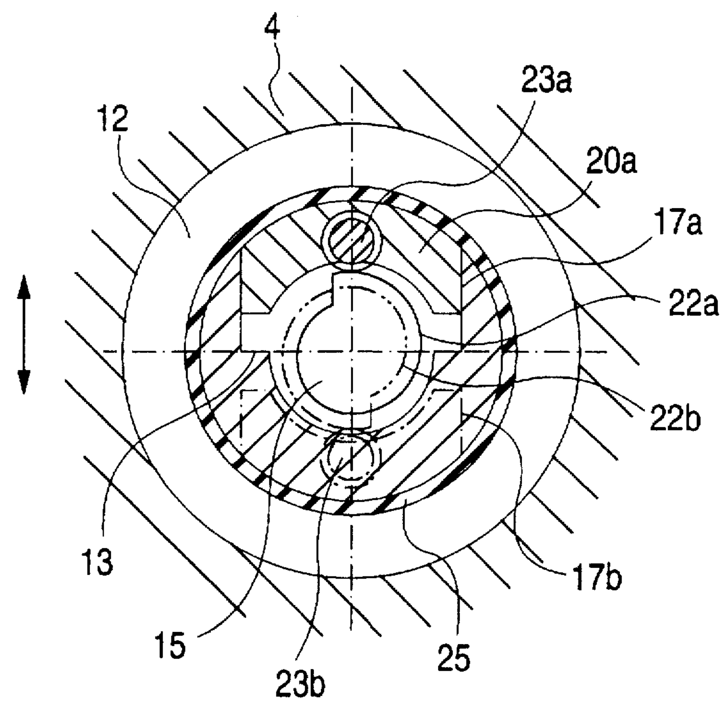
FIG. 2 is a sectional view taken along the line A—A in FIG. 1.
Figure 3:
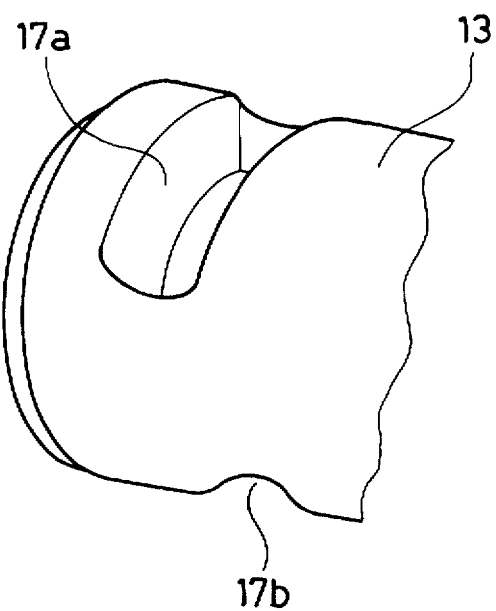
FIG. 3 is a perspective view of the cam casing in FIG. 1.

FIG. 1 is a partly sectional view of a braking device as a first embodiment in a state where the fluid pressure control apparatus according to the present invention is built in a brake caliper, FIG. 2 is a sectional view taken along A—A in FIG. 1, and FIG. 3 is a perspective view of a cam casing in FIG. 1.

In FIG. 1, a braking system is constituted by a master cylinder 1 as a fluid pressure generating source, an electromagnetic valve 2, a fluid pressure control apparatus 3, a brake piston 4 as an actuator provided in the fluid pressure control apparatus, a disc pad 5 provided on the brake piston, an electric motor 6 for driving the fluid pressure control apparatus, an electronic control unit (ECU) 7, and a fluid path 30. A cylinder 11 is formed in a body 10 of the fluid pressure control apparatus 3 (in this-embodiment, a caliper of a disc brake acts also as this body 10), and the brake piston 4 is slidably disposed in this cylinder 11. The disc pad 5 is attached on the brake piston 4 in a well-known manner.

The cylinder 11 and the brake piston 4 constitute a fluid pressure chamber 12 which communicates with the master cylinder 1 as a fluid pressure generating source through the electromagnetic valve 2 provided in the fluid path 30.

A cam casing 13 is disposed in the fluid pressure chamber 12 and fixed to the body 10 by means of a nut 14 fluid-tightly. A bore 16 is formed in a central portion of the cam casing 13 so that a cam shaft 15 is disposed in this hole 16. Piston accommodation windows 17*a* and 17*b* are formed so as to communicate with the bore 16 so that pressure control pistons 20a and 20b which will be described later are slidably fitted to the piston accommodation windows 17*a* and 17*b*. Since a configuration in which the pressure control pistons 20*a* and 20*b* are disposed so as to be shifted from each other in the axial direction of the cam shaft 15 is employed, the piston accommodation windows 17*a* and 17*b* are formed in positions shifted from each other in the axial direction of the cam shaft correspondingly. In FIG. 3, one of the piston accommodation windows formed in the cam casing is shown in a perspective view.

The cam shaft 15 is supported by means of bearings 18 and 19 in the bore 16 in the central portion of the cam casing 13 and a long shaft portion-of the cam shaft 15 is further supported by a shaft guide 21. Cams 22*a* and 22*b* are formed axially successively on the cam shaft 15. The positions of the cams 22*a* and 22*b* correspond to the respective piston accommodation windows 17*a* and 17*b* formed in the cam casing 13.

Figure 4:
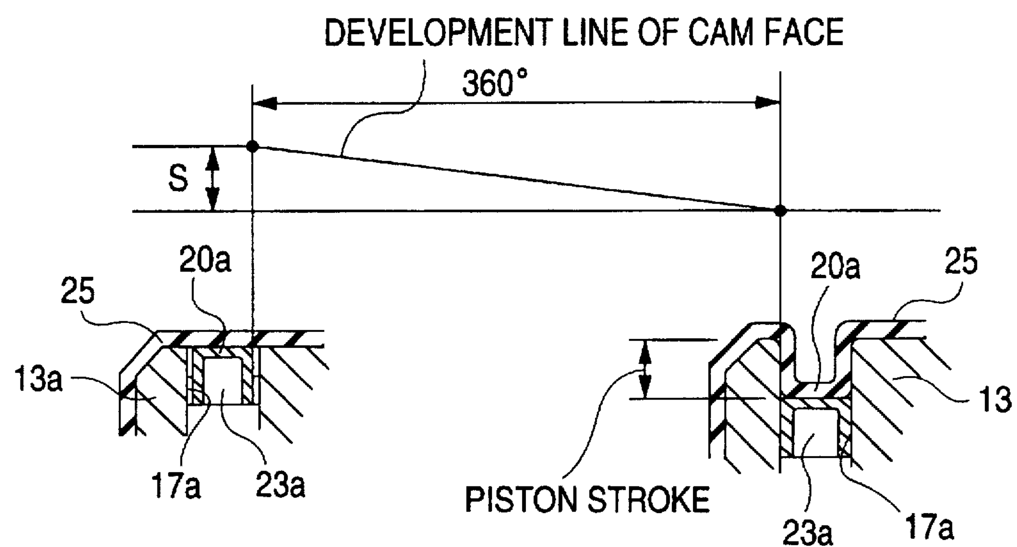
FIG. 4 is a developed view of the cam face for anti-lock control.

Rollers 23*a* and 23*b* are brought into contact with the cams 22*a* and 22*b* respectively as shown in FIGS. 1 and 2, and these rollers 23*a* and 23*b* are rotatably held by the pressure control pistons 20*a* and 20*b* respectively. Each of the cams 22*a* and 22*b* is formed so as to have a cam face having a shape the radius of which from the center of the cam shaft is gradually increased (see FIG. 2) so that the maximum piston stroke can be obtained by 360° rotation of the cam. FIG. 4 shows the development of this cam face of the cam 22*a* (22*b*). In the drawing, S represents the amount of maximum stroke of the piston. In this embodiment, in a normal state shown in FIG. 2, the cam is in the state of maximum stroke and the head portion of the pressure control piston is held in a position which agrees with the outer circumferential face of the cam casing.

The end portion of the cam shaft 15 is formed so as to project from the shaft guide 21, and a large gear 23 is fixed to the tip end of the cam shaft 15 so as to mesh with a pinion 24 mounted on an output shaft of the motor 6. The gear 23 and pinion 24 constitute a cam drive mechanism. A flexible boot 25 is provided so as to surround the cam casing 13 to thereby prevent brake fluid from leaking out of the fluid pressure chamber 12 through the piston accommodation windows 17*a* and 17*b*.

Accordingly, when the cam shaft 15 rotates counterclockwise by 360° from the position shown in FIG. 2, the pressure control pistons 20*a* and 20*b* disappear, following the cam faces, into the piston accommodation windows 17*a* and 17*b* formed in the cam casing 13 to thereby enlarge the volume in the fluid pressure chamber 12. At this time, the boot 25 is also deformed by the fluid pressure in the fluid pressure chamber 12 with the movement of the pressure control pistons as shown in FIG. 4. Incidentally, if a fluid-tight slidable seal is provided between each piston accommodation window and corresponding pressure control piston, the boot 25 may be eliminated.

The aforementioned electromagnetic valve 2 and motor 6 are connected to the electronic control unit (ECU) 7, so that the electronic controller 7 drives the motor 6 to rotate in accordance with a signal from a speed sensor (not shown) or the like, and at the same time operates the electromagnetic valve 2 to perform anti-lock control in a manner which will be described later.

Incidentally, in the drawings, the reference numeral 26 represents a seal member provided between the brake piston 4 and the body 10.

The operation of the braking device having such a configuration will be described below.

Normal Braking

At the time of normal braking, no command is issued from the electronic controller 7 so that the electromagnetic valve 2 and the motor 6 do not operate. The cams are in the initial positions as shown in FIGS. 1 and 2. Accordingly, if the brake pedal is depressed in this state so that fluid pressure is generated in the master cylinder 1, this fluid pressure is fed from the master cylinder 1 to the fluid pressure chamber 12 through the opened electromagnetic valve 2 and the fluid path 30 to move the brake piston 4 to thereby perform braking action. At this time, the pressure control pistons 20*a* and 20*b* do not move because the cam shaft 15 does not rotate.

When the brake pedal is released from depression, the braking fluid in the fluid pressure chamber 12 is flowed back into the master cylinder 1 through the path reverse to the aforementioned path so that the braking is relaxed.

Anti-lock Control

When the brake pedal is depressed in order to brake a vehicle, fluid pressure is generated in the master cylinder 1. This fluid pressure is fed to the fluid pressure chamber 12 in the braking device as described above so that the brake piston 4 is moved to give braking force to the wheel.

In this condition, the state of the wheel is always detected by a speed sensor (not shown) or the like so that a detection signal is supplied, as an input signal, to the known electronic controller and the-electronic controller calculates the wheel speed, the slip ratio, the deceleration, etc., on the basis of the input signal. The electronic controller evaluates the skid state of the wheel on the basis of the calculation result and controls the electromagnetic valve 2 and motor 6 in the following manner to thereby perform various control modes on the braking fluid pressure such as fluid pressure decrease, fluid pressure maintain, fluid pressure repressurization, etc.

That is, when the wheel is locked in running and a brake relax signal is outputted from the electronic control unit (ECU) 7, the electromagnetic valve 2 is closed and the motor 6 is driven to rotate the cam shaft 15 counterclockwise in FIG. 2 through the pinion 24 and the large gear 23. With the rotation of the cam shaft 15, the rollers 23*a* and 23*b* follow the cams 22*a* and 22*b* while rotating so that the pressure control pistons 20*a* and 20*b* gradually disappear into the piston accommodation windows 17*a* and 17*b* respectively (see FIG. 4). As a result, the volume of the inside of the fluid pressure chamber 12 becomes large while deforming the boot 25 by the fluid pressure in the fluid pressure chamber 12 so that the braking fluid pressure is decreased to weaken the braking force to thereby eliminate the locked state of the wheel.

Further, at the time of repressurization, if the motor 6 is made to rotate reversely to rotate the cam shaft 15 toward its initial position, the pressure control pistons 20a and 20b are pushed back into the fluid pressure chamber 12 so that repressurization is performed.

Further, when a command for keeping the braking fluid pressure is issued, the motor 6 is stopped so that the braking fluid pressure in the fluid pressure chamber 12 is maintained.

The various control modes on the braking fluid pressure (fluid pressure decrease, fluid pressure maintain, and fluid pressure repressurization) in the aforementioned braking device are performed independently of each other in accordance with the state of each wheel or performed for the wheel of every channel. The anti-lock control is released when the signal from the electronic controller disappears. That is, when the signal from the electronic controller disappears, the electromagnetic valve 2 is opened and the cams 22a and 22b are returned to their initial positions so that the pressure control pistons 20a and 20b are also returned to their initial positions in the state of FIG. 1 to establish the normal brake state.

Figure 5:
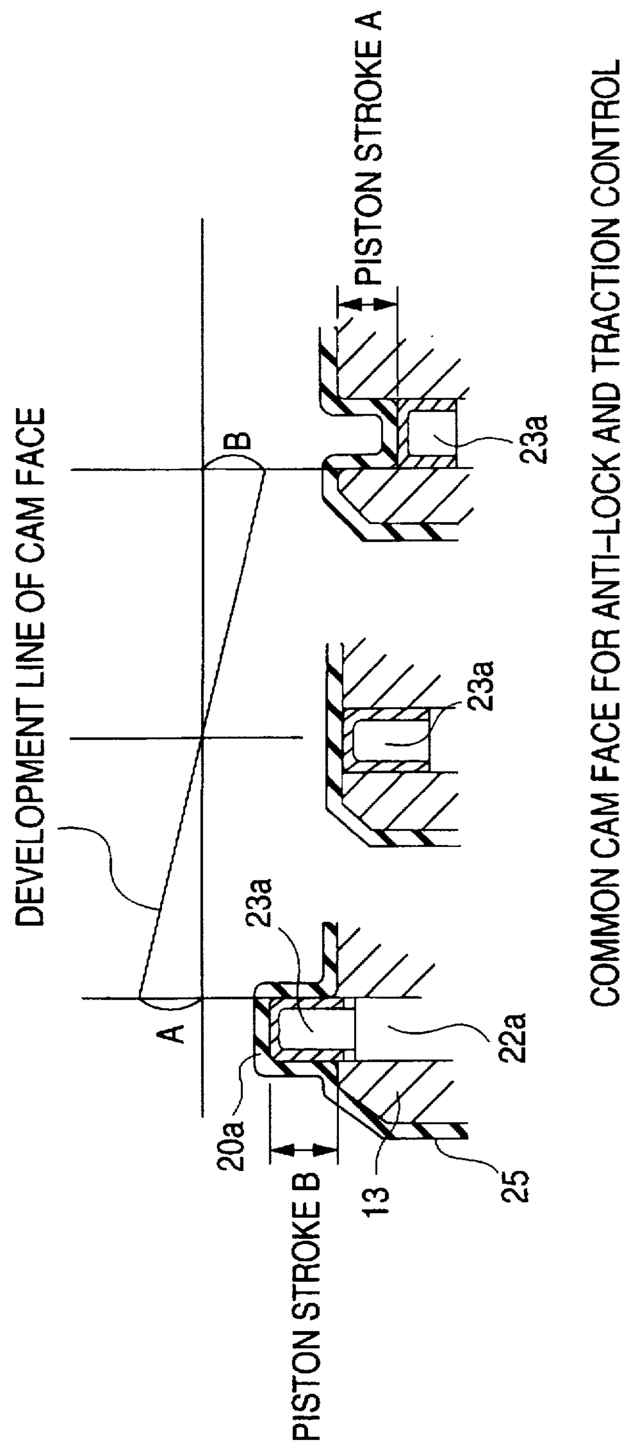
FIG. 5 is a developed view of the cam face for anti-lock control, traction control, and automatic braking.

Incidentally, the aforementioned cam faces may employ various shapes in accordance with the control modes. For example, as shown in FIG. 5, if the initial position of pressure control piston is set to a center position of the developed form of the cam, the fluid pressure in the fluid pressure chamber can be increased when the cam shaft is rotated, with reference to this initial position, in the direction to make the pressure control piston project out of the cam casing. Thus, it is possible to perform automatic brake, and traction control. When the cam shaft is rotated, with reference to the initial position, in the direction to make the pressure control piston disappear into the cam casing, on the contrary, the fluid pressure in the fluid pressure chamber can be reduced as described above, whereby the anti-lock control can be performed.

The operations of the traction control and automatic brake in FIG. 5 will be briefly described below. For example, in case where wheel slipping occurs at the time of departure of a vehicle, or in case where the safety distance between oneself and a car ahead is reduced, the electromagnetic valve 2 is closed and the cam shaft 15 is rotated in the direction to push the pressure control pistons 20a and 20b into the fluid pressure chamber 12 as shown in FIG. 5 so that the braking fluid pressure in the fluid pressure chamber 12 increases and braking acts on the wheel.

In the traction control, the state of the wheel is always detected by a speed sensor and a detection signal of the sensor is supplied to an electronic controller which per se is known so that the electronic controller calculates the wheel speed, the slip ratio, the deceleration, etc., on the basis of the supplied detection signal. On the basis of the results of calculation, the electronic controller evaluates the state of the wheel slipping and controls the electromagnetic valve 2 and the motor 6 to thereby perform the various control modes of the braking fluid pressure such as fluid pressure decrease, fluid pressure maintain, fluid pressure repressurization, etc. in the same manner as the aforementioned anti-lock control.

Further, when a not-shown inter-car distance sensor detects a fact that the distance between oneself and a car ahead is decreased to be not larger than a predetermined value, the electronic controller supplies signals to control the electromagnetic valve 2 and the motor 6 to thereby perform the various control modes of the braking fluid pressure such as fluid pressure increase, fluid pressure keeping, fluid pressure reduction, etc., to perform automatic braking.

As described above, according to this embodiment, the pressure in fluid pressure chamber is controlled by the movement of the pressure control pistons generated by the cam faces whereby the braking fluid pressure control such as fluid pressure decrease, fluid pressure maintain, fluid pressure repressurization, etc., can be performed in accordance with the braking mode.

Next, referring to FIG. 6, a second embodiment of the present invention will be described below.

The second embodiment has a feature in that the positions of the cams provided on the cam shaft are changed from that in the first embodiment. The second embodiment is different from the first embodiment particularly in that only one cam is provided so as to operate two pressure control pistons at the same time in the former while two cams are provided sequentially in the axial direction of the cam shaft in the latter. The second embodiment will be described mainly about the different point (fluid pressure control apparatus) from the first embodiment.

Figure 6:
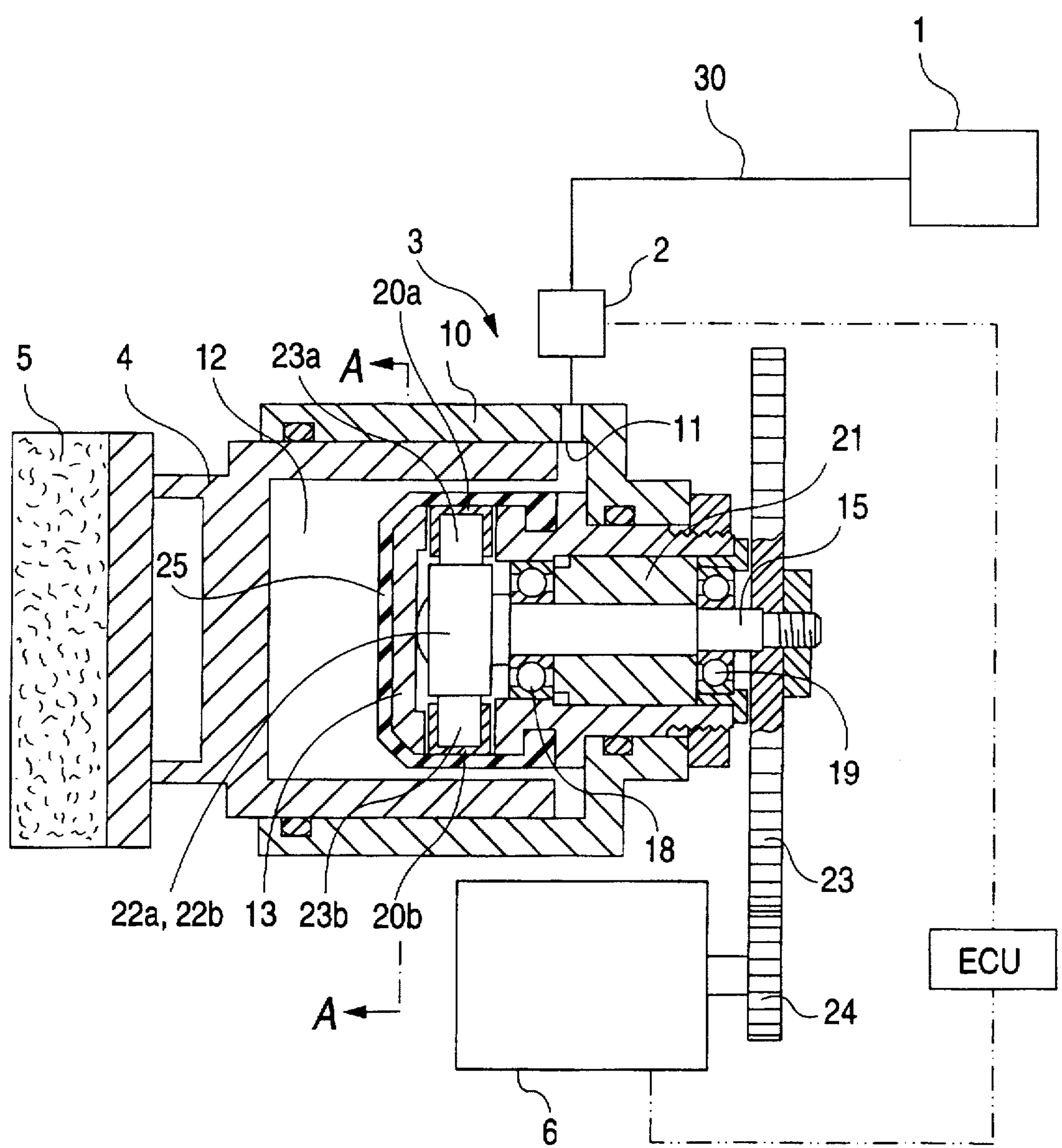
FIG. 6 is a schematic view showing the configuration of the braking device as a second embodiment of the present invention.

In FIG. 6, the brake system is constituted by a master cylinder 1 as a fluid pressure generating source, an electromagnetic valve 2, a fluid pressure control apparatus 3, a brake piston 4 as an actuator provided in the fluid pressure control apparatus, a disc pad 5 provided in the brake piston, a motor 6 for driving the fluid pressure control apparatus, an electronic control unit (ECU) 7, and a fluid path 30. The basis system is the same as that of the first embodiment.

A cylinder 11 is formed in the body 10 of the fluid pressure control apparatus 3, and the brake piston 4 is slidably disposed in the cylinder 11.

The cylinder 11 and the brake piston 4 constitute a fluid pressure chamber 12 which communicates with the master cylinder 1 as the fluid pressure generating source through the electromagnetic valve 2 provided in the fluid path 30.

A cam casing 13 is disposed in the fluid pressure chamber 12 and fixed to the body 10 fluid-tightly by means of a nut 14. An bore 16 is formed in the center portion of the cam casing 13 so that a cam shaft 15 is disposed in this bore 16. Piston accommodation windows 17a and 17b are formed so as to communicate with the bore 16 and the pressure control pistons 20a and 20b are disposed in the piston accommodation windows 17a and 17b respectively. The piston accommodation windows 17a and 17b are formed vertically symmetrically with each other in the drawing unlike the first embodiment.

The cam shaft 15 is supported by bearings 18 and 19 in the bore 16 at the center portion of the cam casing 13, and a long shaft portion of the cam shaft 15 between the bearings 18 and 19 is supported by a shaft guide 21. A cam having cam portions 22a and 22b is formed at an end portion of the cam shaft 15 so that the cam portions 22a and 22b correspond to the respective piston accommodation windows 17a and 17b which are vertically symmetrically formed in the cam casing 13.

Figure 7:
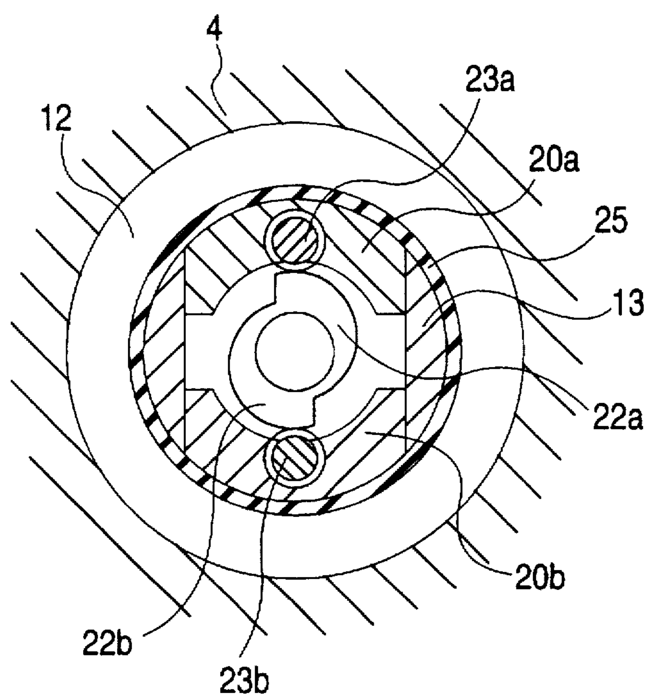
FIG. 7 is a sectional view taken along the line A—A in FIG. 6.

The cam is divided into the two cam portions 22a and 22b circumferentially by 180° as shown in FIG. 7 so that the cam portions 22a and 22b can operate the two pressure control pistons 20a and 20b at the same time. Rollers 23a and 23b rotatably supported by the respective pressure control pistons 20a and 20b are brought into contact with the cam portions 22a and 22b. Each of the cams 22a and 22b has a cam face the radius of which from the center of the cam shaft 15 becomes gradually large and the maximum piston stroke can be obtained by the 180° rotation of the cam as seen in FIG. 7. In this embodiment, in a normal state shown in FIG. 7, each of the cams 22a and 22b is in the state of maximum stroke and the head portion of each of the pressure control pistons 20*a* and 20*b* is held at a position coincident with the outer circumferential face of the cam casing 13.

The cam shaft 15 is formed so that its end portion projects out from the shaft guide 21, and a large gear 23 is fixed to the projected end of the cam shaft 15 so as to mesh with a pinion 24 attached to the output shaft of the motor 6. A flexible boot 25 is provided so as to surround the cam casing 13 to thereby prevent brake fluid from leaking out of the fluid pressure chamber 12 through the piston accommodation windows 17*a* and 17*b*.

Accordingly, when the cam shaft 15 rotates counterclockwise by 180° from the position shown in FIG. 7, the pressure control pistons 20*a* and 20*b* disappear, following the cam faces, into the piston accommodation windows 17*a* and 17*b* formed in the cam casing 13 to thereby enlarge the volume in the fluid pressure chamber 12.

The electromagnetic valve 2 and the motor 6 are connected to the electronic controller (ECU) 7, so that the electronic controller 7 drives the motor 6 to rotate in accordance with a signal from a speed sensor (not shown) or the like, and at the same time operates the electromagnetic valve 2 to perform anti-lock control in the same manner as the first embodiment. The operation of the second embodiment is omitted here.

In this embodiment, as described above, since the configuration is made so that the two pressure control pistons 20*a* and 20*b* can be driven by the cam portions 22*a* and 22*b* formed on the cam shaft 15 in the axially same position, the whole length of the cam shaft 15 can be shortened to thereby attain reduction in size as well as in weight of the apparatus.

Further, the cam can employ various shapes in accordance with the control mode in the same manner as the first embodiment to thereby make it possible to perform also automatic brake and traction control.

Next, referring to FIG. 8, a third embodiment of the present invention will be described.

The third embodiment has a feature in that only the fluid pressure control apparatus is separately provided unlike the first and second embodiments. Specifically, while the fluid pressure control apparatus is built in a caliper of the braking device in the first and second embodiments, this third embodiment is different from the two preceding embodiments in that only the fluid pressure control apparatus is separately provided.

The third embodiment will be described below mainly about the different point from the first and second embodiments.

Figure 8:
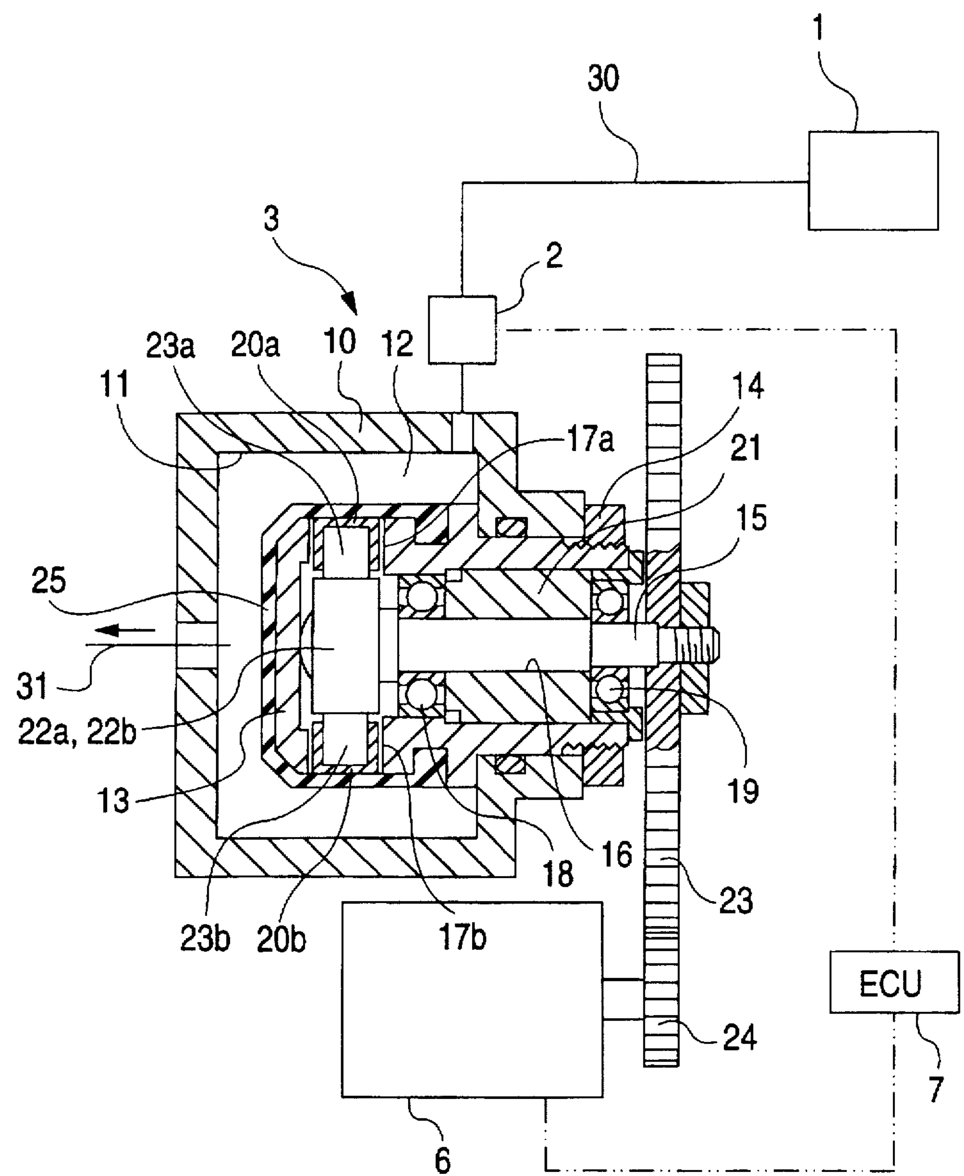
FIG. 8 is a schematic view showing the configuration of the braking device as a third embodiment of the present invention.

In FIG. 8, a fluid pressure control system is constituted by a fluid pressure generating source 1, an electromagnetic valve 2, a fluid pressure control apparatus 3, an electric motor 6 for driving the fluid pressure control apparatus, electronic control unit (ECU) 7, and fluid paths 30 and 31.

A cylinder 11 is formed in a body 10 of the fluid pressure control apparatus 3, and a fluid pressure chamber 12 is formed in this cylinder 11. This fluid pressure chamber 12 communicates with the fluid pressure generating source 1 through the electromagnetic valve 2 provided in the fluid path 30 and with an actuator (for example, a wheel cylinder provided in a conventional braking device) through the fluid path 31.

A cam casing 13 is disposed in the fluid pressure chamber 12 and fixed to the body 10 fluid-tightly by means of a nut 14. A bore 16 is formed in the center portion of the cam casing 13 so that a cam shaft 15 is disposed in this bore 16. Piston accommodation windows 17*a* and 17*b* are formed so as to communicate with the bore 16 and pressure control pistons 20*a* and 20*b* are disposed in the piston accommodation windows 17*a* and 17*b* respectively.

The cam shaft 15 is supported by bearings 18 and 19 in the bore 16 at the center portion of the cam casing 13, and a long shaft portion of the cam shaft 15 between the bearings 18 and 19 is supported by a shaft guide 21. A cam having cam portions 22*a* and 22*b* is formed at an end portion of the cam shaft 15 so that the cam portions 22*a* and 22*b* correspond to the respective piston accommodation windows 17*a* and 17*b* of the cam casing 13.

The cam is divided into the two cam portions 22*a* and 22*b* circumferentially by 180° in the same manner as in the second embodiment so that the cam portions 22*a* and 22*b* can operate the two pressure control pistons 20*a* and 20*b* at the same time. Rollers 23*a* and 23*b* rotatably supported by the respective pressure control pistons 20*a* and 20*b* are in contact with the cam portions 22*a* and 22*b*. In this embodiment, in a normal state shown in FIG. 8, each of the cam portions 22*a* and 22*b* is in the state of maximum stroke and the head portion of each of the pressure control pistons 20*a* and 20*b* is held at a position coincident with the outer circumferential face of the cam casing 13. Incidentally, as the shape of the cam, not only the shape described in the first embodiment may be of course employed, but also various an shapes may be employed in accordance with the control mode of the pressure control pistons.

The cam shaft 15 is formed so that its end portion projects out from the shaft guide 21, and a large gear 23 is fixed to the projected end of the cam shaft 15 so as to mesh with a pinion 24 attached to the output shaft of the motor 6. A flexible boot 25 is provided so as to surround the cam casing 13 to thereby prevent brake fluid from leaking out of the fluid pressure chamber 12 through the piston accommodation windows 17*a* and 17*b*.

Accordingly, when the cam shaft 15 rotates counterclockwise by 180° from the position shown in FIG. 8, the pressure control pistons 20*a* and 20*b* disappear, following the cam faces, into the piston accommodation windows 17*a* and 17*b* formed in the cam casing 13 to thereby enlarge the volume in the fluid pressure chamber 12.

The electromagnetic valve 2 and the motor 6 are connected to the electronic control unit (ECU) 7, so that the electronic controller 7 drives the motor 6 to rotate in accordance with a signal from a sensor (not shown) or the like, and at the same time operates the electromagnetic valve 2 to control the fluid pressure in the fluid pressure control circuit in a manner as described later.

The operation of the fluid pressure control apparatus having such a configuration will be described below.

State in Normal Operation

In normal operation, no command is issued form the electronic controller 7 and the electromagnetic valve 2 and the motor 6 do not operate. The cam is in its initial position shown in FIG. 7. If fluid pressure is generated in the fluid pressure generating source 1 in this state, accordingly, this fluid pressure is supplied to the actuator through the fluid path 30, the opened electromagnetic valve 2, the fluid pressure chamber 12, and the fluid path 31 in this order to thereby make the actuator operate.

If the fluid pressure in the fluid pressure generating source 1 is released, the fluid in the fluid pressure chamber 12 is turned back to the fluid pressure generating source 1 through the path reverse to the above case and the actuator is returned to the initial position.

Fluid Pressure Control in Fluid Pressure Control Circuit

When the fluid pressure in the fluid pressure circuit is controlled, the electronic controller 7 drives the electric motor 6 to rotate in accordance with a signal from a sensor or the like, and closes the electromagnetic valve 2 at the same time.

By the drive of the motor 6, the cam shaft 15 is rotated counterclockwise in FIG. 2, through the pinion 24 and the large gear 23. As the cam shaft 15 rotates, the rollers 23*a* and 23*b* follow the cams 22*a* and 22*b* while rotating so that the pressure control pistons 20*a* and 20*b* gradually disappear into the piston accommodation windows 17*a* and 17*b* respectively. As a result, the volume of the fluid pressure chamber 12 is enlarged, the fluid pressure in the fluid pressure circuit is decreased, and the fluid pressure acting on the actuator is reduced.

Further, at the time of repressurization, the motor 6 is driven to rotate reversely to thereby rotate the cam shaft 15 in the direction to its initial position, so that the pressure control pistons 20*a* and 20*b* are pushed back into the fluid pressure chamber 12 to perform the repressurization.

As described above, since the fluid pressure control apparatus is constituted separately in this embodiment, the fluid pressure control apparatus can be disposed not only in a brake circuit but also in any other fluid pressure circuit on demands, whereby the increase/decrease of the fluid pressure in the fluid pressure circuit can be performed smoothly.

Incidentally, it is a matter of course that such a cam shaft mechanism as employed in the first embodiment may be employed also in this embodiment.

As described above in detail, according to the present invention, pressure control pistons are disposed in a fluid pressure chamber formed in a fluid pressure control apparatus body. The pressure control pistons are controlled by using a cam drive mechanism so that the volume in the fluid pressure chamber is controlled to thereby increase/decrease the fluid pressure acting on an actuator. In a braking device in which this fluid pressure control apparatus is built in a brake caliper, anti-lock control, traction control, and automatic brake control can be performed smoothly. Further, it is possible to reduce the braking device in its size as well as weight. Further, by giving various shapes to the cam surfaces in accordance with the braking modes, it is possible to perform optimum braking control. In a braking device in which this fluid pressure control apparatus is built in a brake caliper, the weight below the suspension spring of a vehicle can be reduced. Thus, the present invention can show various superior effects.

What is claimed is:

1. A fluid pressure control apparatus provided in a fluid pressure circuit between a fluid pressure generating source and an actuator, which controls fluid pressure acting on said actuator, comprising:

a cylinder in which a fluid pressure chamber is formed so as to communicate with said fluid pressure generating source and said actuator;

a cam casing disposed in said fluid pressure chamber;

a cam shaft disposed in said cam casing and having a cam face;

a cam drive mechanism for rotating said cam shaft;

a pressure control piston operatively brought into contact with said cam face of said cam shaft and driven by rotation of said cam shaft so as to be moved in a sectional radius direction of said cam shaft, thereby being inserted and extracted from said fluid pressure chamber;

an electromagnetic valve disposed in a fluid path which makes said fluid pressure generating source communicate with said fluid pressure chamber; and an electronic control unit for controlling said electromagnetic valve and said cam drive mechanism.

2. The fluid pressure control apparatus according to claim 1, further comprising a cam formed on said cam shaft, wherein said cam face is formed on said cam by changing a radius of said cam shaft from a rotation center so that said cam face performs control of pressure reduction, pressure keeping and pressurization in said fluid pressure chamber in accordance with rotational angle of said cam.

3. The fluid pressure control apparatus according to claim 2, further comprising a flexible boot provided so as to surround said cam casing, said flexible boot being deformed by fluid pressure in said fluid pressure chamber with a movement of said pressure control piston.

4. The fluid pressure control apparatus according to claim 2, further comprising a roller rotatably held by said pressure control piston, said roller being brought into contact with said cam and following said cam while rotating.

5. A braking device comprising:

a cylinder;

a brake piston slidably disposed in said cylinder, a fluid pressure chamber being defined in said cylinder by said piston;

a cam casing disposed in said fluid pressure chamber;

a cam shaft disposed in said cam casing and having a cam face;

a cam drive mechanism for rotating said cam shaft;

a pressure control piston operatively brought into contact with said cam face of said cam shaft and driven by rotation of said cam shaft so as to be moved in a sectional radius direction of said cam shaft, thereby being inserted and extracted from said fluid pressure chamber;

an electromagnetic valve disposed in a fluid path which makes said fluid pressure generating source communicate with said fluid pressure chamber; and an electronic control unit for controlling said electromagnetic valve and said cam drive mechanism.

6. The braking device according to claim 5, further comprising a cam formed on said cam shaft, wherein said cam face is formed on said cam by changing a radius of said cam shaft from a rotation center so that said cam face performs control of pressure reduction, pressure keeping and pressurization in said fluid pressure chamber in accordance with rotational angle of said cam.

7. The braking device according to claim 6, further comprising a flexible boot provided so as to surround said cam casing, said flexible boot being deformed by fluid pressure in said fluid pressure chamber with a movement of said pressure control piston.

8. The braking device according to claim 6, further comprising a roller rotatably held by said pressure control piston, said roller being brought into contact with said cam and following said cam while rotating.

* * * * *